US005280720A

United States Patent [19]

Heidt

[11] Patent Number: 5,280,720

[45] Date of Patent: Jan. 25, 1994

[54] DEVICE FOR MONITORING A WEB FOR TEARS OCCURING INSIDE A DRYER OF A WEB-FED PRINTING MACHINE

[75] Inventor: Heinrich Heidt, Neckarsteinach, Fed. Rep. of Germany

[73] Assignee: Heidelberger Druckmaschinen AG, Heidelberg, Fed. Rep. of Germany

[21] Appl. No.: 840,745

[22] Filed: Feb. 24, 1992

[30] Foreign Application Priority Data

Feb. 22, 1991 [DE] Fed. Rep. of Germany ....... 4105559

[51] Int. Cl.[5] .............................................. G01N 25/72

[52] U.S. Cl. ........................................... 73/159; 374/4

[58] Field of Search .................. 73/159; 374/4, 45, 57

[56] References Cited

U.S. PATENT DOCUMENTS

| | | | |
|---|---|---|---|
| 3,115,037 | 12/1963 | Forrester | 73/159 |
| 3,159,028 | 12/1964 | Hornbostel, Jr. | 73/159 |
| 3,286,519 | 11/1966 | Hornbostel, Jr. | 73/159 |
| 3,292,418 | 12/1966 | Oehme et al. | 374/57 |
| 3,906,232 | 9/1975 | Meihofer | 250/341 |
| 4,224,824 | 9/1980 | Giusti | 73/159 |
| 4,549,485 | 10/1985 | Nawrath | 101/219 |
| 4,650,345 | 3/1987 | Rochas et al. | 374/9 |
| 4,887,532 | 12/1989 | Kotterer | 101/225 |
| 5,067,402 | 11/1991 | Marx | 101/226 |

FOREIGN PATENT DOCUMENTS

| | | | |
|---|---|---|---|
| 3822497 | 10/1989 | Fed. Rep. of Germany . | |
| 62-96054 | 6/1987 | Japan . | |
| 0964137 | 7/1964 | United Kingdom | 73/159 |

*Primary Examiner*—William A. Cuchlinski, Jr.
*Assistant Examiner*—W. Morris Worth
*Attorney, Agent, or Firm*—Herbert L. Lerner; Laurence A. Greenberg

[57] ABSTRACT

A method of monitoring a web for tears occurring inside a dryer of a web-fed printing machine includes measuring the temperature of a running web by a thermal monitoring device in the proximity of an inlet to the dryer, and actuating a safety device when a sudden increase in the temperature of the web is detected by the thermal monitoring device; and device for performing the method.

8 Claims, 2 Drawing Sheets

Figure 1:
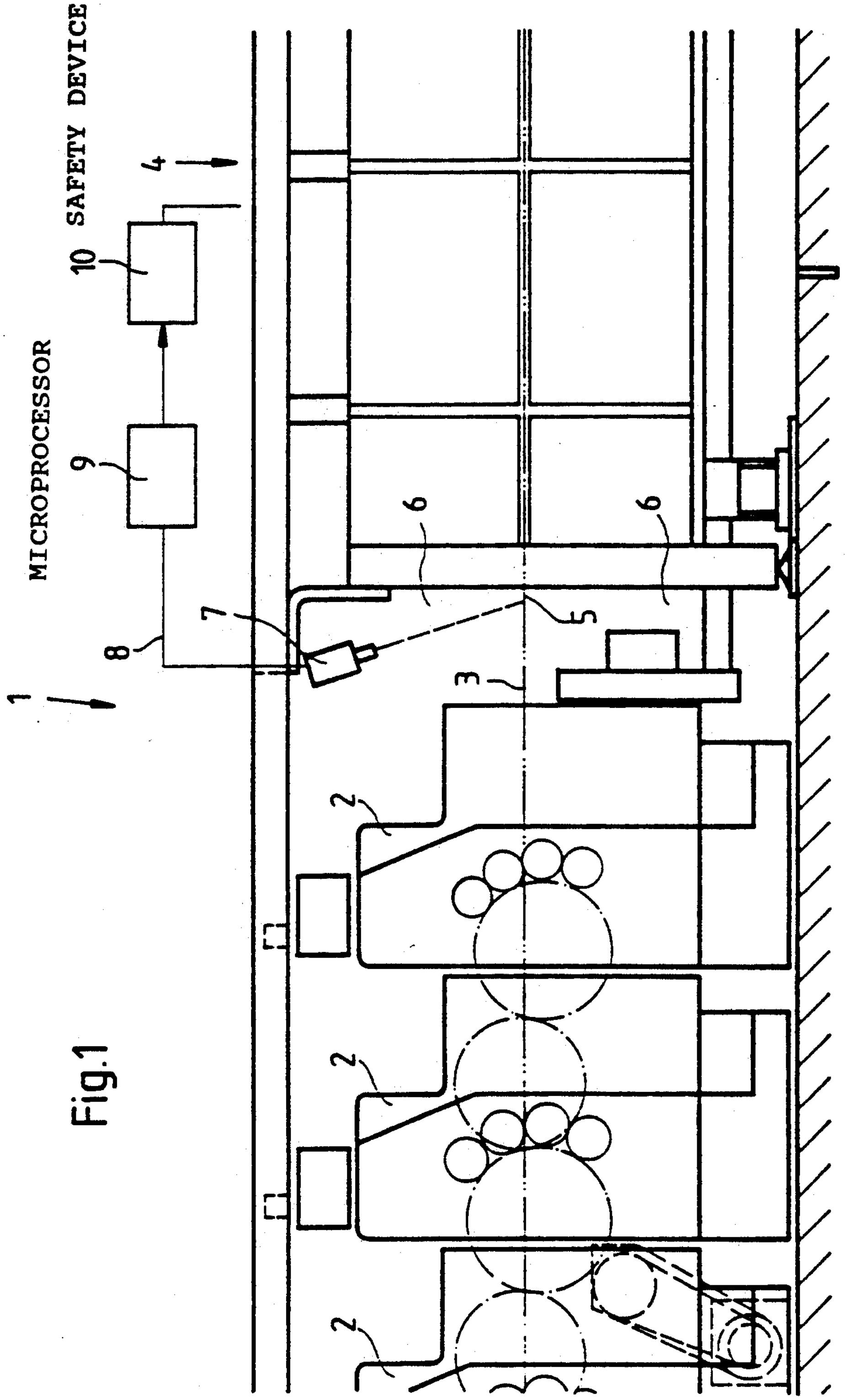

DEVICE FOR MONITORING A WEB FOR TEARS OCCURING INSIDE A DRYER OF A WEB-FED PRINTING MACHINE

The invention relates to a method and a device for monitoring a web for tears occurring inside a dryer of a web-fed printing machine.

The monitoring of a running web for the purpose of immediately detecting a tear of a material web is particularly critical for the web length which is inside the dryer. The high temperatures in the dryer and the high concentration of solvent vapors do not permit the use of conventional photoelectric sensors. For this reason, the web is normally checked outside the dryer. This type of monitoring is problematical, however, because a tear in the web inside the dryer is detected only after the web has left the measuring field of the sensor. Due to the rather lengthy travel paths of the web through the dryer, it is possible that a tear in the web may be detected only after a considerable delay. This increases the risk that the thus slackened web may be drawn back into the last printing unit and wound up on a cylinder therein before appropriate measures, such as stopping the machine, for example, can be taken. Such paper wind-ups or jams which result from adhesive forces existing between the ink of the freshly printed web and the surface of a printing unit cylinder often cause damage to the printing machine.

In order to ensure early detection of web tears occurring also in the dryer, there has been provided heretofore, as described in German Published Non-Prosecuted Application (DE-OS) 38 22 497, a device which takes into account the angular deflection of the web from its normal conveying plane, which results when a web is torn, as an indication or index for the web tear. The operation of this heretofore known web detecting device is based upon the fact that the web which has become slack, due to a web tear, is twisted around a printing unit cylinder of the last printing unit, thereby withdrawing the web from the plane in which it travels during normal operation.

The deflection of the web is registered by two oppositely arranged tear detector switches which are constructed as capacitive switches. The instant a given angle of deflection is exceeded, a safety mechanism, e.g. a web-gripping and/or web-cutting device, is actuated which prevents the web from wrapping itself on a cylinder of the last printing unit.

A disadvantage of the aforementioned heretofore known device which is supposed to prevent damage to the printing machine is that a given angle deflection of the web from its normal conveying plane is merely considered to be only an indication or index of a possible web tear. A risk exists, however, that a corresponding safety mechanism may be actuated thereby without any actual occurrence of a web tear. Moreover, this heretofore known web-detecting device is arranged close to the running web on both sides thereof. This requires space which might otherwise be used for accommodating further sensors in this region which extends between the last printing unit and the inlet to the dryer.

According to the published Japanese specification (JP-GO) 62-96054, a transmitting and receiving device is located outside a dryer, and a web in the dryer is monitored only via glass fibers extending into the dryer. However, a considerable number of such devices must be placed in the dryer area in order to effect an early detection of a web tear. The glass fibers must be distributed over the width of the web in order thereby also to permit detection of an oblique tear. From an economic point of view, the expenses which would be incurred with the application of this heretofore known monitoring device do not justify its use for the purpose of monitoring a web tear inside the dryer.

It is accordingly an object of the invention to provide a reliably functioning method as well as a reliably functioning and inexpensive device of the foregoing general type which permits detection of web tears in the dryer immediately upon their occurrence.

With the foregoing and other objects in view, there is provided, in accordance with the invention, a method of monitoring a web for tears occurring inside a dryer of a web-fed printing machine, which comprises measuring the temperature of a running web by a thermal monitoring device in the proximity of an inlet to the dryer, and actuating a safety device when a sudden increase in the temperature of the web is detected by the thermal monitoring device.

In accordance with another aspect of the invention there is provided a device for monitoring a web for tears occurring inside a dryer of a web-fed printing machine, comprising a thermal monitoring device for measuring the temperature of a running web in the proximity of an inlet to the dryer, and a safety device connected to the thermal monitoring device and actuatable thereby upon detection of a sudden increase in temperature of the web, for preventing damage to the web-fed printing machine.

The invention makes use of the fact that, due to the adhesive forces existing between the freshly printed web and a printing cylinder unit, the web which has gone slack due to a web tear in the dryer, is drawn into the last printing unit where it is wound up on a cylinder thereof. Because the web lengths which are in the dryer become considerably heated, a sharp increase in temperature of the web is registered at the inlet to the dryer the instant the web springs back towards the last printing unit as a result of a web tear.

In accordance with another feature of the invention, the thermal monitoring device is an infrared detector.

In accordance with a further feature of the invention, the safety device comprises means for stopping the printing machine upon the detection of a sudden increase in temperature of the web.

In accordance with a concomitant feature of the invention, the safety device has means for catching or cutting the web. The torn web is thereby prevented from being twisted around or wound up in the last printing unit.

Other features which are considered as characteristic for the invention are set forth in the appended claims.

Although the invention is illustrated and described herein as embodied in a device for monitoring a web for tears occurring inside a dryer of a web-fed printing machine and as a method of operating the device, it is nevertheless not intended to be limited to the details shown, since various modifications and structural changes may be made therein without departing from the spirit of the invention and within the scope and range of equivalents of the claims.

Figure 2:
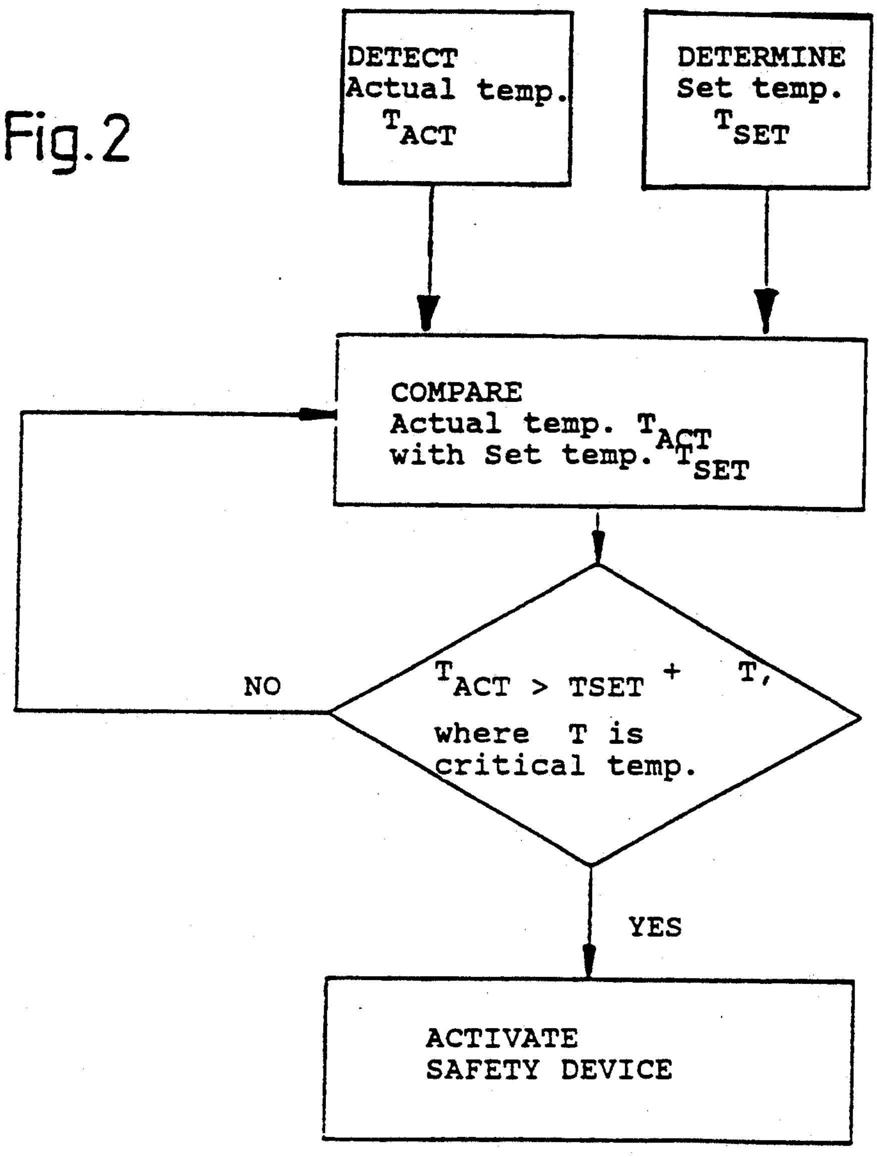

The construction and method of operation of the invention, however, together with additional objects and advantages thereof will be best understood from the following description of specific embodiments when read in connection with the accompanying drawings, in which:

FIG. 1 is a fragmentary diagrammatic and schematic longitudinal elevational view of a web-fed printing machine having a dryer and incorporating the device for monitoring a tear in a web within the dryer, in accordance with the invention; and FIG. 2 is a flow chart for controlling the device of the invention for monitoring a tear in a web within the dryer of a web-fed printing machine.

Referring now to the drawings and, first, particularly to FIG. 1 thereof, there is shown therein a web-fed rotary printing machine 1. A web 3 of material, such as paper, is drawn into printing units 2 of the web-fed printing machine where printing with various ink colors is successively performed thereon. Thereafter, the freshly printed web 3 enters a dryer 4 wherein it is heated up to temperatures of 150° to 180° C. A thermal monitoring device 7 is disposed in a space 6 located between a last printing unit 2, in the travel direction of the web 3 from the left-hand to the right-hand side of FIG. 1, and the dryer 4. The thermal monitoring device 7 is positioned so that it receives infrared radiation from the heated web 3 in direct proximity of an inlet 5 to the dryer 4. Measuring data are transmitted from the thermal monitoring device 7 to a microprocessor 9 via a data line 8.

If the web 3 should tear inside the dryer 4, the web 3 becomes slack in the region following the last printing unit 2. Due to the adhesive forces existing between the freshly printed web 3 and a surface of a cylinder of the last printing unit 2 carrying the web 3, the torn end of the web 3 is drawn back into the last printing unit 2 where it becomes wound up on the blanket cylinder of the last printing unit 2. Such paper jams usually cause damage to the printing machine or, at least, result in standstills or shut-down times of considerate duration.

As noted hereinbefore, the thermal monitoring device 7 is positioned so as to detect the infrared radiation reflected by the web 3 in the vicinity of the inlet 5 to the dryer 4. The instant a torn end of the web 3 springs back out of the inlet 5 of the dryer 4 towards the last printing unit 2 due to the occurrence of a web tear inside the dryer 4, the thermal monitoring device 7 receives intensified infrared radiation from the web section which has already been heated in the dryer 4. A sudden increase in temperature detected by the thermal monitoring device 7 clearly indicates that the web 3 has become torn inside the dryer 4. The device according to the invention thus detects a web tear inside the dryer immediately upon its occurrence. As a result thereof an appropriate safety device 10, such as is known from U.S. Pat. No. 4,549,485, for example, is actuated.

FIG. 2 is a flow chart showing steps for controlling the device according to the invention for monitoring a web 3 for tears which might occur therein in accordance with the invention. As a first step, a normal or set value of the temperature $T_{set}$ is detected, i.e. the temperature of the running web 3 is determined before it enters the dryer 4. During the printing process, the temperature is constantly monitored in a direct proximity of the dryer inlet 5. Via a data line 8, the actual temperature values $T_{act}$ are transmitted to a microprocessor 9 which continuously compares the measured temperature values $T_{act}$ with the nominal or set temperature value $T_{set}$.

As long as the actual or measured temperature values $T_{act}$ lie within a tolerance range $\Delta T$ for the set temperature value $T_{set}$, the web-fed printing machine 1 operates in a trouble-free manner. If there is, however, a sudden increase in temperature, i.e. if the measured temperature $T_{act}$ is considerably higher than the set temperature value $T_{set}$, this indicates that the web 3 has been torn inside the dryer 4. In accordance with a further step from the program derivable from the flow chart of FIG. 2, an appropriate safety measure is taken immediately, i.e. either the machine is stopped or appropriate gripping or cutting devices are actuated to safeguard the web 3.

I claim:

1. Device for monitoring a web for tears occurring inside a dryer of a web-fed printing machine into which the web passes, comprising a thermal monitoring means for detecting, in the proximity of an inlet to the dryer, the temperature value of a web running into the dryer through said inlet, temperature setting means for establishing a set temperature value, comparing means connected to said thermal monitoring means and to said temperature setting means, for continuously comparing the detected temperature value of the web with said set temperature value and, evaluating means connected to said comparing means for determining a sudden increase in the detected temperature value exceeding a tolerance range for the temperature value, and a safety device connected to said evaluating means being responsive to said evaluating means for performing a function which prevents damage to the printing machine.

2. Device according to claim 1, wherein said thermal monitoring means is an infrared detector.

3. Device according to claim 1, wherein said safety device comprises means for stopping the printing machine.

4. Device according to claim 1, wherein said safety device has means for catching or cutting the web.

5. Method of monitoring a web for tears occurring inside a dryer of a web-fed printing machine into which the web passes, the method which comprises the steps of: establishing a set temperature value $T_{SET}$; continuously detecting the actual temperature value $T_{ACT}$ of the web in proximity of an inlet to the dryer; continuously comparing the set temperature value $T_{SET}$ with the actual temperature value $T_{ACT}$; determining a sudden increase in the actual temperature value $T_{ACT}$ of the web exceeding a tolerance range $\Delta T$ for the set temperature value Tset, and signalling, in case of a sudden increase in the actual temperature value $T_{ACT}$ of the web, a safety device for performing a function for preventing damage to the web-fed printing machine.

6. Method according to claim 5, wherein the function for preventing damage to the printing machine includes stopping the printing machine.

7. Method according to claim 5, wherein the function for preventing damage to the printing machine includes gripping a torn end of the web to prevent the web end from jamming the printing machine.

8. Method according to claim 5, wherein the function for preventing damage to the printing machine includes cutting off a torn end of the web to prevent the web end from jamming the printing machine.

* * * * *